United States Patent [19]

DeTrano et al.

[11] Patent Number: 5,300,164
[45] Date of Patent: Apr. 5, 1994

[54] PNEUMATIC TIRE HAVING A DECORATIVE APPLIQUE AND A METHOD FOR APPLYING A DECORATIVE APPLIQUE TO A TIRE

[75] Inventors: Mario N. DeTrano, Massillon; James H. C. Yang, Cleveland; George G. A. Bohm, Akron; Arthur E. Oberster, North Canton; Russell W. Koch, Hartville, all of Ohio

[73] Assignee: Bridgestone Corporation, Tokyo, Japan

[21] Appl. No.: 832,455

[22] Filed: Feb. 7, 1992

[51] Int. Cl.$^5$ .................... B60C 13/04; B29D 30/72
[52] U.S. Cl. .................... 156/116; 152/524; 152/DIG. 12
[58] Field of Search .............. 156/116; 152/524, 523, 152/525, DIG. 12

[56] References Cited

U.S. PATENT DOCUMENTS

| | | | |
|---|---|---|---|
| 2,334,388 | 11/1943 | Daniel | 156/116 X |
| 2,746,515 | 5/1956 | Usack | 156/116 |
| 2,979,099 | 4/1961 | Rowe | 156/116 |
| 3,449,201 | 6/1969 | Palmquist et al. | 152/524 X |
| 4,461,795 | 7/1984 | Ogawa | 152/524 X |
| 4,495,326 | 1/1985 | Donatelli et al. | 524/533 |
| 4,500,466 | 2/1985 | Hayes et al. | 260/429.9 |
| 4,767,481 | 8/1988 | Bryant et al. | 156/116 |
| 4,853,069 | 8/1989 | Williams et al. | 156/401 |
| 4,929,684 | 5/1990 | Roland et al. | 525/161 |
| 4,987,192 | 1/1991 | Oberster et al. | 525/274 |
| 5,049,220 | 9/1991 | Gartland et al. | 156/116 |
| 5,058,647 | 10/1991 | Gartland et al. | 152/524 |

FOREIGN PATENT DOCUMENTS 2006692 5/1979 United Kingdom ............... 152/524

OTHER PUBLICATIONS

P. 237, of a encyclopedic-like technical article, which discusses ethylene glycol plasticizers.
Specification sheet entitled "Adiprene L-367" from DuPont.

Primary Examiner—Geoffrey L. Knable
Attorney, Agent, or Firm—Daniel N. Hall

[57] ABSTRACT

According to the present invention, a pneumatic tire includes a cured tread area, an outer sidewall area connected to the tread area, and an outer bead connected to the sidewall area at an end thereof and defining an opening for receiving a wheel. The tire also includes a precured, elastomeric, decorative applique and an applique-contacting adhesive layer positioned between the sidewall and the applique. A method according to the present invention, of providing a cured pneumatic tire with a decorative outer sidewall, includes the step of bonding to the outer sidewall of the cured pneumatic tire a cured, elastomeric, decorative applique with an adhesive layer.

9 Claims, 1 Drawing Sheet

U.S. Patent    Apr. 5, 1994    5,300,164
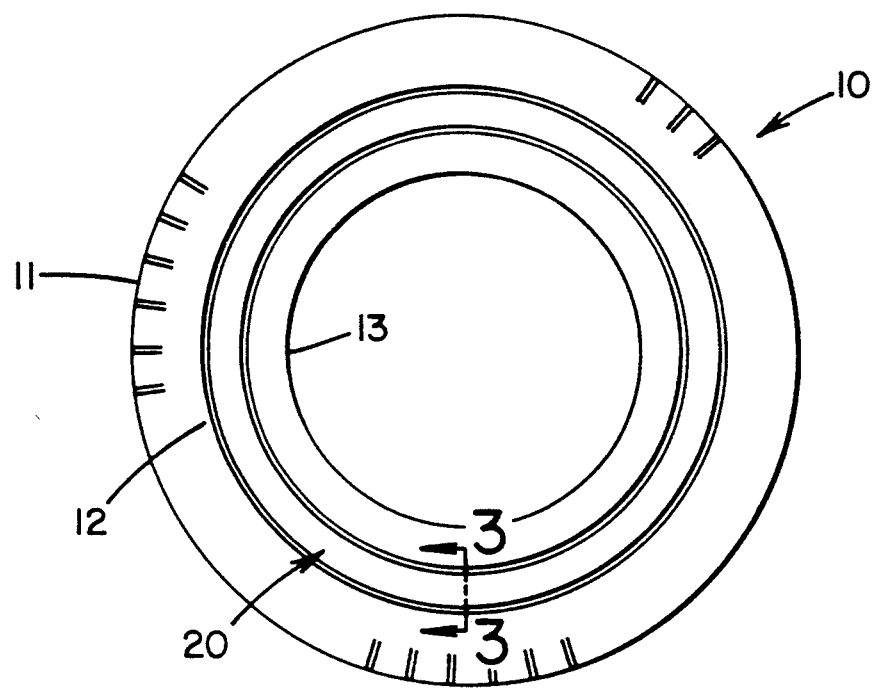
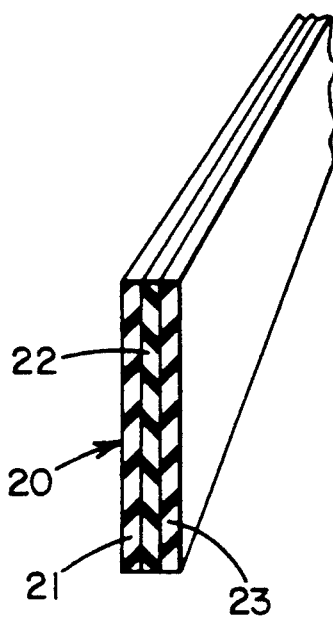 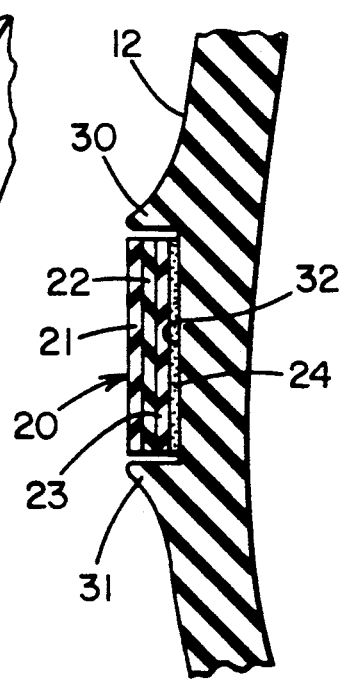 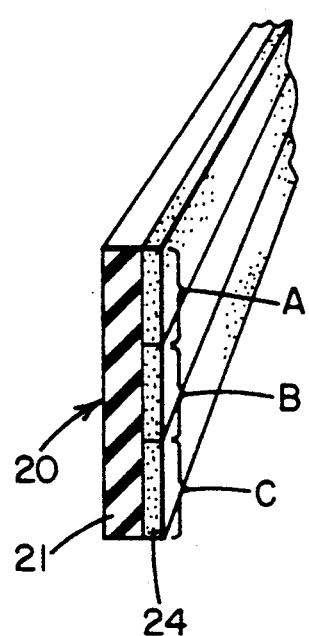

PNEUMATIC TIRE HAVING A DECORATIVE APPLIQUE AND A METHOD FOR APPLYING A DECORATIVE APPLIQUE TO A TIRE

TECHNICAL FIELD

The invention herein is related to the art of pneumatic vehicle tires. More particularly, the invention is related to such tires having a decorative applique on the outer sidewall thereof. Specifically, the invention relates to a cured pneumatic tire having a pre-cured decorative applique adhered to it.

BACKGROUND ART

Heretofore, tires having decorative sidewalls have been well known and well received in the marketplace. The decorative portion of sidewalls have typically been formed by the co-extrusion of black rubber along with colored or white rubber, the resulting extrudate being applied to the sidewall of the tire and co-vulcanized therewith during the curing process. This co-extrusion process involves expensive materials, processing steps, and equipment. Further, the previously known process may result in blemishes, imperfections, voids and the like in the sidewall area, greatly increasing waste during the manufacturing process. The need to handle colored or white rubber stocks during tire manufacture has also proved inconvenient in many instances.

It has also become popular to design tires having decorations such as words, designs, letters, logos and the like on the sidewall, the same being introduced to the tire through molding or extruding processes which are also time consuming and expensive. As with the tires having decorative bands, these tires have a characteristic waste factor associated therewith, significantly adding to the manufacturing costs. The expense of sophisticated molds and dies to achieve such "custom" tires has made such tires unavailable to the average member of the consuming public.

An example of an uncured applique being co-cured with a green tire is found in U.S. Pat. No. 5,058,647. An example of an uncured applique applied to a cured tire is disclosed in U.S. Pat. No. 5,049,220. Both of these methods for providing a decorative sidewall onto a tire add to the processing difficulty and expense of the tire, as discussed hereinabove.

Therefore a need exists for an effective applique and method for applying the applique to a cured tire, which does not involve the expensive and time consuming curing processes associated at present with the manufacture of such pneumatic tires.

DISCLOSURE OF THE INVENTION

It is therefore an object of the present invention to provide a tire having a decorative applique thereon.

It is another object of the present invention to provide a cured tire with a cured decorative applique thereon.

It is a further object of the present invention to provide a method for making a tire having a decorative applique thereon.

It is still another object of the present invention to provide a method for making a cured tire with a cured applique.

At least one or more of the foregoing objects, together with the advantages thereof over the existing art, which shall become apparent from the specification which follows, are accomplished by the invention as hereinafter described and claimed.

In general, the present invention provides an improvement in a cured pneumatic tire having a tread area and an outer bead and an outer sidewall area extending therebetween, the bead defining an opening for receiving a wheel, wherein the improvement comprises a cured, elastomeric, decorative applique and an adhesive layer on the outer sidewall of the tire. The adhesive layer is interposed between and bonded to both the applique and the outer sidewall of the tire.

The present invention also provides a tire which comprises a cured tread area and an outer bead and an outer sidewall area extending therebetween, the bead defining an opening for receiving a wheel, and, in addition, a cured, elastomeric, decorative applique on the outer sidewall of the tire, and an adhesive layer positioned between the outer sidewall and the applique.

A method according to the present invention of providing a cured pneumatic tire with a decorative sidewall comprises the step of bonding to the outer sidewall of the cured pneumatic tire a cured, elastomeric, decorative applique, with an adhesive.

BRIEF DESCRIPTION OF THE DRAWINGS

FIG. 1 is an elevational view of a tire having a decorative applique thereon according to the aspects of the present invention;

FIG. 2 is a fragmentary, oblique pictorial, cross-sectional view of the decorative applique as depicted in FIG. 1;

FIG. 3 is a fragmentary sectional view of the tire shown in FIG. 1, taken substantially along line 3—3 thereof.

FIG. 4 is a fragmentary, oblique pictorial, cross-sectional view of an alternative embodiment of the decorative applique as depicted in FIG. 1.

PREFERRED EMBODIMENTS FOR CARRYING OUT THE INVENTION

In contrast with previous pneumatic tires having decorative outer sidewalls thereon, such as those wherein an extrudate is molded and/or vulcanized thereto, the instant invention provides a cured applique maintained upon a cured tire. More particularly, the present invention provides for a cured applique adhesively bonded to a cured tire. As will be appreciated by those skilled in the art, by practice of the present invention, it is not necessary to fabricate different tires having different appliques thereon. In other words, the tire manufacturer is free to make essentially one group of master tires and then apply a variety of decorative appliques to them. Furthermore, because the applique according to the invention is pre-cured before being applied to a cured tire, the applique has a greater storage and cold flow stability, and is easier to store and handle than uncured appliques.

Hence, according to the present invention, the tire itself may be fabricated without a separate decorative outer sidewall being built directly into the tire. Problems such as blemishes, imperfections, voids, imbalance and modulus change which are sometimes associated with the manufacturing process, are effectively avoided in the sidewall. It will be further appreciated from the following discussion, that a tire having an applique according to the present invention, will provide for more efficient tire production and weight saving in the tire itself, and may, therefore, improve tire performance, due to more uniformity and integrity therein.

As shown in FIG. 1 on the attached drawings, a pneumatic tire of substantially conventional design is generally indicated by the numeral 10. Tire 10 is provided with a tread area 11, an outer sidewall area 12 and an outer bead 13. By "outer" it is understood to mean the side of tire 10 which is visible when mounted upon a vehicle. It is understood that all tires have two beads and two sidewalls. Bead 13 defines an opening for receiving a wheel (not shown), and sidewall 12 extends between and joins tread area 11 and bead 13. While the composition of tire 10 is not an aspect of the present invention, it is understood that the composition includes conventional components such as synthetic and/or natural rubbers, fillers, carbon black, anti-aging components and the like.

Tire 10 according to the present invention, is provided with a decorative applique generally indicated by the numeral 20, in a manner to be more fully described hereinbelow. As best shown in FIG. 2, applique 20 includes an outer or visible layer 21. By "visible" it is intended to convey the understanding that layer 21 is that which can be seen when tire 10 having applique 20 maintained thereon is completed. This does not require that any other layer of applique 20 cannot also be visible in the completed tire 10, or that only one decorative visible layer is an absolute restriction of the invention. For ease in describing the present invention however, reference will be made to an applique having only one visible layer 21.

Visible layer 21 may be formed from any material which will accomplish the objects of the invention. In a particular, preferred embodiment, the invention provides a tire with a continuous elastomeric ring of the type often employed as a "white sidewall" for a tire. As will be further discussed hereinbelow, the applique is not limited to a white material, and may be any color or combination of colors desired. Furthermore, visible layer 21 may be a ring as depicted in the drawings, or it may be any other shape such as raised letters or the like. Furthermore, visible layer 21 may be provided with a plurality of colors, designs, markings, textures, lettering or the like.

An example of a preferred composition for a continuous ring applique 20, is a conventional white sidewall stock. Such stocks are known to contain components such as rubber, for example, chlorobutyl rubber, natural rubber, and ethylene-propylene diene terpolymers (EPDM) and mixtures thereof; and a colorant such as titanium dioxide for the color white. Other colorants such as those disclosed in U.S. Pat. No. 4,987,192, which is incorporated by reference herein, may be employed without restriction to form a visible layer 21 having any color or combinations of colors desired. Furthermore, other ingredients such as zinc methacrylates for improving, for example, static tensile modulus, may be employed in the composition of visible layer 21. Zinc methacrylate compounds are exemplified in U.S. Pat. Nos. 4,500,466 and 4,495,326. The use of zinc dimethacrylate-containing rubber stocks in sidewalls is disclosed in U.S. Pat. No. 4,929,684. Other examples of components added to the visible layer 21 composition would include reinforcing agents such as silica or the like.

By way of example only, a conventional white wall stock formulation is presented in TABLE I hereinbelow. This stock may be formed and cured in any conventional manner.

TABLE I

| EXEMPLARY WHITE WALL STOCK FORMULATION | |
|---|---|
| Ingredient | Amount[a] |
| Chlorobutyl Rubber | 50.0 |
| Natural Rubber | 30.0 |
| EPDM | 20.0 |
| Titanium Dioxide | 35.0 |
| Magnesium Silicate | 23.0 |
| Clay | 22.0 |
| Ultramarine Blue | 0.6 |
| Stearic Acid | 1.0 |
| Wax | 2.5 |
| Oil | 3.0 |
| Tackifier | 2.0 |
| Zinc Oxide | 12.0 |
| Sulfur | 0.5 |
| Accelerator | 2.25 |

[a] parts by weight

Visible layer 21 may be applied directly to the tire 10 and be within the scope of the present invention. However, it is preferred that visible layer 21 be affixed to an optional, intermediate or barrier layer 22. The purpose of barrier layer 22 is to prevent certain ingredients in tire 10, such as antioxidants, from reaching and discoloring visible layer 21. As an example, one preferred barrier layer 22 is composed of a blend of halobutyl rubber such as chlorobutyl rubber, and natural rubber.

While barrier layer 22 may be formed from any materials which will accomplish the objects of the invention, and while the barrier layer may an adhesive material as will be more fully discussed hereinbelow, one example of an elastomeric barrier layer formulation is given in TABLE II.

TABLE II

| EXEMPLARY ELASTOMERIC BARRIER LAYER FORMULATION | |
|---|---|
| Ingredient | Amount[b] |
| Cholorbutyl Rubber | 92.0 |
| Natural Rubber | 4.0 |
| SBR[c] | 4.0 |
| Carbon Black | 70.0 |
| Oil | 13.0 |
| Magnesium Oxide | 0.3 |
| Zinc Oxide | 2.0 |
| Stearic Acid | 1.5 |
| Tackifier | 0.3 |
| Sulfur | 0.3 |
| Accelerator | 0.7 |

[b] parts by weight
[c] Styrene/butadiene rubber

In a further embodiment of the invention, an inner or compatibilizing layer 23 is affixed either directly to visible layer 21, or it is affixed to barrier layer 22 and sidewall 12 of tire 10 as depicted in FIG. 2. By "compatibilizing" layer 23, it is understood to mean that the layer is composed of a material which is substantially the same as or compatible with the material of tire 10 upon which applique 20 is maintained. For example, if applique 20 is maintained upon sidewall 12 of tire 10, and sidewall 12 is formed from certain sidewall stock, then compatibilizing layer 23 is formed from a substantially similar sidewall stock material.

One example of a sidewall stock composition is shown in TABLE III hereinbelow.

TABLE III

EXEMPLARY SIDEWALL STOCK COMPOSITION

| Ingredient | Amount[d] |
| --- | --- |
| Polybutadiene Rubber | 65.0 |
| Natural Rubber | 35.0 |
| Carbon Black | 50.0 |
| Oil | 10.4 |
| Zinc Oxide | 1.6 |
| Stearic Acid | 1.2 |
| Antioxidant | 4.8 |
| Wax | 2.4 |
| Tackifier | 3.2 |
| Sulfur | 2.6 |
| Accelerator | 0.8 |

[d] parts by weight

Applique 20 is maintained upon tire 10 with an adhesive material as will be discussed hereinbelow. Applique 20 having compatibilizing layer 23 thereon will adhere more readily to tire 10 if it is formed from a material the same or substantially the same as the material of tire 10 upon which it is maintained. For example, if applique 20 is maintained upon sidewall 12 of tire 10, then compatibilizing layer 23 is preferably formed from a rubber stock the same as or similar to the sidewall stock of sidewall 12. Of course, compatibilizing layer 23 may also be formed from a different material, such as another compatible rubber or any other suitable material, and still be within the scope of the invention. Furthermore, applique 20 may contain any number of layers and also be within the scope of the invention. For example, as shown in FIG. 4, applique 20 may include only a visible layer 21 bonded with an adhesive layer 24.

Applique 20 may be formed by any technique conventional in the art without limitation. For example, visible layer 21 may be extruded, or visible layer 21 and/or barrier layer 22 and compatibilizing layer 23 may be coextruded. The layers may also comprise strips which are calendered into a composite structure, or they may be die cut from a sheet. The actual method of manufacturing applique 20 is not critical to the invention. It is important however, that applique 20 be precured before it is applied to cured tire 10, in a manner to now be described. Curing of the applique may be by any conventional method, such as heat and/or chemical curing or high energy irradiation.

Applique 20 is maintained upon tire 10 by an adhesive layer being bonded to it and tire 10, as depicted by the numberal 24 in FIG. 3. In that figure, adhesive 24 is depicted as a layer positioned or interposed between applique 20 and sidewall 12 of tire 10. Adhesive 24 is any adhesive which will bond applique 20 securely to tire 10. Examples of suitable adhesives include those formed from or based upon urethane, cyanoacrylate, epoxy, polyvinyl alcohol, acrylate, methacrylate, polyvinyl chloride, polyester and the like. Thermoplastic elastomers and rubber retread cements may also be employed as the adhesive such as Patch Rubber V-10 Extruder Cement, Patch Rubber Brush Type Vulcanizing and Retread Cement, and Sup-R-Tac, all available from the Assignee of record. EP 5908-29A/B, Fusor 305-1/305-2 and Chemlok 234B, all three of which are available from Lord Chemical Corporation of Erie, Penn., are also examples of adhesives useful for the practice of the present invention.

One preferred urethane adhesive for practice of the present invention, contains the components in the amounts as listed in TABLE IV hereinbelow.

TABLE IV

URETHANE ADHESIVE

| Ingredient | Parts by Weight |
| --- | --- |
| Adiprene L-367[e] | 100 |
| HGO Plasticizer[f] | 20 |
| CTB 810[g] | 1 |
| Acetone (solvent) | 20 |

[e] a polyether-based urethane, available from DuPont; known to have an isocyanate content of from 6.15 to 6.55 percent
[f] a polyethylene glycol, available from Union Carbide Corporation
[g] a black pigment The adhesive shown in TABLE IV is preferably mixed with about 32 parts by weight of Caytur 21, an amine curative available from Uniroyal Chemicals.

Depending upon the particular adhesive chosen, applique 20 may be bonded to tire 10 with or without heat and/or pressure being applied thereto. For example, Chemlok 234B bonds at elevated temperatures (130°-140° C.), and with higher pressures being applied. EP 5908-29A/B and Fusor 305-1/305-2 bond at ambient temperatures. Similarly, the time necessary for the adhesive to set or cure will vary depending upon the actual adhesive chosen.

Applique 20 may be applied by hand to tire 10, or it may be applied with a support device (not shown). For example, if applique 20 is a ring as depicted in the drawings, a ring plate fixture may be employed to apply pressure and/or heat to the applique, as may or may not be required by the particular adhesive employed.

According to the present invention, the adhesive layer, such as adhesive layer 24, may also function as a barrier layer in a manner similar to barrier layer 22. The adhesives discussed hereinabove may have barrier properties to prevent staining of visible layer 12. Cyanoacrylates, such as Loctite 447 from Loctite Corporation, are one example of an adhesive which will function as a barrier layer. Separate barrier layer 22 may or may not be employed when the adhesive has barrier properties. Any adhesives which when cured or set, will prevent materials from tire 10 from staining or otherwise degrading applique 20, are within the scope of the invention.

According to the present invention, and as exemplified in FIG. 4 of the attached drawings, adhesive layer 24 may include more than one adhesive composition employed to bond applique 20 to tire 10 for reasons to be discussed hereinbelow. For example, a first adhesive section A, a second adhesive section B, or indeed any number of such adhesive sections may be employed. A third adhesive section C may be employed, for example.

It is preferred in one embodiment of the invention to provide at least one adhesive section, such as first adhesive section A, which includes an adhesive composition having a cure or "set" rate which is slower than the cure rate of another adhesive section, such as second adhesive section B. In this way, some adhesives which provide strong bond strength between applique 20 and tire 10 may be employed while during tire production operations the faster curing adhesives allow the tire to be further processed or otherwise handled sooner than if only the slower curing adhesive were employed. When the slower adhesive finally cures, maximum bond strength is achieved.

One example of an adhesive layer 24 would include first and third sections A and C, each of which is an adhesive having a substantially identical urethane or epoxy adhesive component. Second adhesive section B may include a cyanoacrylate adhesive component, which is generally known to have a cure rate faster than either urethane or epoxy adhesives. Of course, any combination of adhesives may be employed. For example, first section A may be a urethane, second section B may be a cyanoacrylate and third section C may be an epoxy. Also, based upon the nature of the adhesives chosen, a urethane or epoxy adhesive may be the "fast" adhesive, while another adhesive has the quality of being the one with the "slower" cure rate. Similarly, the cyanoacrylate may be the "slow" cure rate adhesive, again depending upon the actual adhesives chosen, all such adhesives are within the scope of the invention. Also, while first, second and third sections A, B and C are depicted in FIG. 4 as being distinctive layers, it is understood that commingling and/or reaction of the adhesives of each section may occur.

While applique 20 is depicted as being adhered directly to the tire 10 in the drawings, it is to be understood that tire 10 may have a layer, such as a barrier layer (not shown) similar to barrier layer 22, or a compatibilizing layer (not shown) similar to compatibilizing layer 23 or the like, built into and cured with tire 10, to which applique 20 is bonded.

The method according to the present invention, includes the step of bonding an applique 20 as described hereinabove, to a tire 10 with a suitable adhesive such as was also described. Different adhesives will require different methods of application, all of which are within the scope of the invention. Furthermore, certain adhesives may require a step of priming the surfaces to be bonded, such as with Chemlok 7701 or TS 3135-57 from Lord Chemical Corporation, or any other suitable primer. Further, still, the surfaces to be bonded may be smooth or roughened to enhance bonding, in manners conventional in the bonding art. Other steps may also be taken as necessary.

It is preferred that the adhesive selected be capable of bonding applique 20 to tire 10, such that a bond or peel strength of from about 5 to about 150 or more, and more preferably, from about 25 to about 100 pounds per linear inch, is achieved.

One exemplary method according to the present invention includes wiping applique 20 and tire 10 with a solvent to remove mold release agents, oils, dirt, etc. The surfaces to be bonded may then be buffed to RMA1 or RMA2 Standard Buffing Textures, or the like. Loose particles from buffing are then removed by another solvent wipe. The surfaces may then be primed if necessary depending upon the nature of the adhesive to be employed. The adhesive is then applied to the applique 20, the tire 10 or both. The applique 20 is then joined or pressed against tire 10 at the desired location, with or without heat and pressure.

As discussed hereinabove, tire 10 is preferably of any design conventional in the art. Tire 10 may be provided however, with ridges 30 and 31 forming a channel 32 therebetween (FIG. 3). Furthermore, when used to form a decorative sidewall, ridges 30 and 31 may be concentric, as depicted in the drawings. An applique 20 may then be affixed to tire 10 by being positioned within channel 32. In addition to aiding the facile positioning of the appliques, the ridges 30 and 31 provide a degree of protection to applique 20 when tire 10 is in use upon a vehicle. Scuff damage, such as that resulting from contact with curbs, which is always a concern and a problem with decorative sidewalls and tires in general, may be substantially alleviated by placing applique 20 within channel 32.

Applique 20 may be of a variety of thicknesses, such as from about 5 to about 500 mils. More preferably, applique 20 may be from about 50 to about 90 mils thick. The individual layers which may be employed to form a composite applique 20 as discussed hereinabove, may also vary within these thickness ranges. One factor used to determine the actual thickness of applique 20 will be the desired scuff resistance and hence, the dimensions of ridges 30 and 31 and depth of channel 32, as will be appreciated by one skilled in the art.

As briefly discussed hereinabove, it will be appreciated that tire 10 may be manufactured without regard to the actual applique 20 to eventually be bonded thereto. Tire 10 may be employed upon a vehicle without an applique 20, or with an applique 20 of any suitable color, design or the like. Hence, expensive and time consuming custom manufacturing procedures are not required as with the previous art.

Furthermore, it is within the scope of the invention to provide a tire having one sidewall which is smooth, and another sidewall on the opposite side of the tire having channel 32 for receiving applique 20. The "smooth" sidewall (not shown) is conventionally known in the art as a "blackwall". With such an embodiment of the invention, only one master tire needs to be manufactured, and it can be employed as either a blackwall or as a tire having a decorative sidewall. Also, with such an embodiment, either sidewall may be employed as the "outer" sidewall of the tire, as desired by the user.

GENERAL EXPERIMENTAL

In order to exemplify the practice of the present invention, a number of decorative appliques, tires having decorative appliques and test samples were prepared according to the disclosure made hereinabove. Tests conducted included adhesion test, curb scuff test and indoor road wear simulation tests. The actual tests performed will be individually discussed hereinbelow.

PEEL ADHESIONS TESTS

In the adhesion tests, a test similar to ASTM D413 was conducted for a number of test pads to be further discussed hereinbelow. In the test, a standard six inch by six inch and 1.5 inch by six inch adhesion pads were prepared which consisted of two plies of fabric-backed sidewall stock. These pad members were then cured in a mold for 20 minutes at 328° F. The pad member was then subsequently bonded together with the appropriate adhesive as will be discussed hereinbelow. Bonded pads (1 inch×6 inches die cut from the larger pads) were then tested for bond strength at room temperature using an Instron Tensile Tester.

Example 1

Each 1.5 inch by 6 inch pad member was solvent wiped, buffed to RMA1 or RMA2 and solvent wiped again. Chemlok 234B adhesive was then applied by brush and the pads were then joined together by hand.

Each pad was placed in a six (6) inch platen cure press with only the upper platen heated to a surface temperature of 150° C., at 40 psi for 45 minutes. Peel adhesion strength was measured and found to be 36 pounds per linear inch (pli).

Example 2

Additional pad members were prepared as in Example 1, except that the adhesive employed was Fusor 305-1/305-2, which was applied by spatula. About 3 psi of pressure was applied to each pad for 24 hours at room temperature. Peel adhesion strength was 50 pli.

CURB SCUFF TESTS

The curb scuff tests were also conducted on actual tires having actual appliques applied thereto. The test tire was mounted on a vehicle at the front passenger side position, and the tire was then driven squarely against a test curb at a vehicle speed of about 5 to 15 miles per hour. Fifty complete rotations of the tire against the curb were made. The tire was judged to have passed the test if no delamination occurred after a significant number of rotations. The appearance of the test tires were compared to that of a conventional white wall tire that had gone through the same scuff test.

Example 3

A conventional cured tire having a channel thereon was solvent wiped. The applique was buffed to RMA1 or RMA2 and solvent wiped. Chemlok 234B was applied to both the tire and the applique, and allowed to air dry for one hour. The applique was then applied to the tire with a Ring-Plate Fixture at a surface temperature of 150° C. for 30 minutes at 30 psi. The sidewall thus prepared passed the scuff test described hereinabove.

Example 4

Another tire was prepared as above, except that the tire and the applique were both primed with Lord Chemical TS 3135-57 and air dried for five minutes. Fusor 305-1/305-2 was then applied to the tire channel by spatula. A Ring-Plate Fixture was employed at room temperature for 48 hours at about 5 psi, to affix the applique to the tire. The tire passed the curb scuff test.

Example 5

Another tire was prepared as in Example 4, employing the urethane adhesive formulation of TABLE IV hereinabove as the adhesive. The applique was applied with a Ring-Plate Fixture at 70° C. for 45 minutes at about 5 psi. The tire passed the curb scuff test.

Example 6

Another tire was prepared as in Example 4, with the adhesive being Lord Chemical EP 5908-29A/B, and two coats of that adhesive. The applique was applied by hand at room temperature and passed the scuff test on a somewhat more marginal basis than the tires in Examples 3-5 hereinabove.

Example 7

A commercial white sidewall tire, having a white portion built directly into the tire by conventional techniques, developed an unsightly and unacceptable appearance after less than 15 rotations of the curb scuff test.

INDOOR ROAD WEAR SIMULATION TESTS

Indoor tests were conducted under controlled conditions employing a testing apparatus which simulates vehicle and load weights, temperature conditions and vehicle speeds.

Example 8

A tire was prepared according to Example 3 hereinabove. The tire was inflated to 32 psi according to its specification. A durability test was conducted by running the tire at 50 miles per hour (mph) at about 100° F. ambient temperature for various times and at various loads as reported in TABLE V.

TABLE V

| | ROAD TEST DATA | |
|---|---|---|
| Stage | Time (hours) | Design Load[h] |
| 1 | 4 | 100 percent |
| 2 | 6 | 100 percent |
| 3 | 24 | 100 percent |
| 4 | 8 | 130 percent |
| 5 | 8 | 145 percent |
| 6 | 8 | 160 percent |
| 7 | 8 | 175 percent |
| 8 | 8 | 190 percent |

[h] a percentage of the load which the tire was designed to be subjected to in normal usage The tire was found to have passed the durability test, because no delamination of the applique occurred.

Example 9

A tire was prepared as in Example 4 hereinabove, except that the Ring-Plate Fixture was heated to a surface temperature of 110° C., and about 5 psi pressure was applied for about ten minutes. The same durability test was applied to this tire as was applied to the tire in Example 8, with this tire showing marginal results, possibly as a result of a bond line thickness that was too thin.

Example 10

A tire according to Example 8 was prepared. The tire was inflated to 24-26 psi and then cooled at −40° C. for 2.5 hours. The tire was then run at 30 mph to 50 mph for 24 minutes. The cycle was repeated 25 times without delamination of the applique.

Example 11

A tire as in Example 9 was tested as in Example 10 without applique delamination.

Based upon the foregoing disclosure, it should now be apparent that the use of the applique and method described herein will carry out the objects set forth hereinabove. It should also be apparent to those skilled in the art that the method of the present invention can be practiced to manufacture a variety of tires having appliques thereon. Similarly, the adhesive and the temperatures and pressures used to bond the applique to the tire will vary as discussed hereinabove.

It is, therefore, to be understood that any variations evident fall within the scope of the claimed invention and thus, the selection of specific number, color and shape of applique layers, the compositions thereof, the adhesive or adhesives employed, the primer, if used, and the buffing and other method steps may be made, without departing from the spirit of the invention herein disclosed and described. Moreover, the scope of the invention shall include all modifications and variations that may fall within the scope of the attached claims.

What is claimed is:

1. A pneumatic tire comprising:

a cured tread area and an outer bead, and an outer sidewall area extending therebetween, the bead defining an opening for receiving a wheel;

a pre-cured, elastomeric, decorative applique on said outer sidewall of the tire; said applique comprising a visible layer and a rubber barrier layer; and, an adhesive layer positioned between said outer sidewall and said applique; said adhesive layer comprising a first and a second adhesive section each comprising an adhesive composition; each of said first and second adhesive sections each being in adhesive contact with the tire and said applique; wherein said first adhesive section has a cure rate which is faster than said second adhesive section; said applique being bonded to the tire with a peel strength of at least 25 pounds per linear inch.

2. A pneumatic tire, as set forth in claim 1, wherein the tire further comprises a first and a second protective ridge maintained upon said outer sidewall proximate to said applique, and extending outwardly from said tire, forming a channel between said first and second ridges.

3. A pneumatic tire, as set forth in claim 2, wherein said applique is positioned within said channel.

4. A pneumatic tire, as set forth in claim 1, wherein said adhesive layer further comprising a third section which comprises the same adhesive composition as said first section.

5. A pneumatic tire, as set forth in claim 4, wherein said first and third sections comprise an adhesive composition comprising a component selected from the group consisting of urethane and epoxy; and, said second section comprises cyanoacrylate.

6. A method of providing a cured pneumatic tire with a decorative outer sidewall, comprising the step of:

bonding to the outer sidewall of the cured pneumatic tire a pre-cured, elastomeric, decorative applique with an adhesive; said adhesive comprising a first and a second adhesive section each comprising an adhesive composition; each of said first and second adhesive sections each being in adhesive contact with the tire and said applique; wherein said first adhesive section has a cure rate which is faster than said second adhesive section; and wherein said applique is bonded to the tire with a peel strength of at least 25 pounds per linear inch; said applique comprising a visible layer and a rubber barrier layer.

7. A method, as set forth in claim 6, further comprising the step of priming the surface of the tire to be provided with said applique with a primer.

8. A method, as set forth in claim 6, further comprising the step of buffing said applique before said step of bonding.

9. A method, as set forth in claim 6, wherein said adhesive further comprises a third adhesive section comprising an adhesive composition which is substantially identical to said first adhesive composition and which is also in adhesive contact with the tire.

* * * * *